United States Patent [19]

Gardner

[11] 4,255,387
[45] Mar. 10, 1981

[54] HIGH PRESSURE TUBULAR REACTOR APPARATUS

[75] Inventor: Harold F. Gardner, Odessa, Tex.

[73] Assignee: El Paso Polyolefins Company, Paramus, N.J.

[21] Appl. No.: 974,287

[22] Filed: Dec. 29, 1978

[51] Int. Cl.³ .................. G05D 16/00; F16K 17/40; B01J 4/00; B01J 19/00
[52] U.S. Cl. .................. 422/113; 422/117; 422/134
[58] Field of Search ............ 422/113, 117, 134, 138

[56] References Cited

U.S. PATENT DOCUMENTS

| | | | |
|---|---|---|---|
| 3,073,810 | 1/1963 | Ross | 422/138 X |
| 3,628,918 | 12/1971 | Beals et al. | 422/134 |
| 3,871,830 | 3/1975 | Chauvier | 422/113 |
| 4,008,049 | 2/1977 | Clemmen et al. | 422/111 |
| 4,071,325 | 1/1978 | Platz et al. | 422/134 |

Primary Examiner—Barry Richman
Attorney, Agent, or Firm—Fred S. Valles; Margareta LeMaire

[57] ABSTRACT

In a high pressure tubular reactor containing a plurality of tubular sections interconnected in series by means of connection devices, which reactor contains one or more reaction zones, there is positioned within each reaction zone a single rupture disc device from about 24 to about 40 feet downstream from the reaction zone inlet.

8 Claims, 4 Drawing Figures

HIGH PRESSURE TUBULAR REACTOR APPARATUS

BACKGROUND OF THE INVENTION

The polymerization of ethylene in the presence of oxygen and/or free radical initiators in tubular reactors at high pressures and temperatures is well known in the art. It is also well known to increase the polymer productivity rate by introducing the initiator at more than one point along the length of the reactor, thereby establishing as many reaction zones within the tubular reactor as there are initiator injection points in the system.

Commercial size reactors are generally constructed of a plurality of tubular segments connected in series relation by blocks or other connection devices. The dimensions of the reactors include inside diameters broadly in the range of from about 0.5 to about 3 inches typically between about 1 and about 1.5, and total lengths of from about 800 to about 3000 feet or even longer. In order to confine the reactor system to an area of reasonable and practical dimensions, the tube is provided with many bends, e.g. in the fashion shown in FIG. 1 of U.S. Pat. No. 4,008,049, hereby incorporated into this specification by reference.

The polymerization reaction is highly exothermic and causes a rapid rise in the temperature along the length of a reaction zone until it reaches a peak when the initiator has been used up and polymerization discontinues. Cooling in one form or the other is required to control the reaction temperatures within safe and desired limits and to reduce the temperature of the reaction mixture to a suitable initiation temperature after which it is contacted with additional initiator in the subsequent reaction zone. It is therefore the usual practice to employ water-cooled jacketed reactors and in addition to introduce relatively cool side streams of the ethylene feed along the length of the reactor in cooling zones located between the reaction zones. In addition to the beneficial cooling effect achieved by the ethylene side stream introductions, further yield advantages are obtained thereby.

There are pressure fluctuations occurring in these tubular reactors employed for the production of polyethylene resulting in temperature changes within the reactor. Some of these pressure changes are incidental to reactions taking place during polymerization, but other pressure changes are purposefully employed to prevent accumulation of polymer on the interior walls of the reactor tube, these purposeful changes being known as "bump cycles" and being effected by the operation of "let-down" valves at the exit end of the reactor. This bump cycle may, for example, cause the reduction of pressure from 40,000 psi to 35,000 psi, this being a drop of 5,000 psi which causes shiftings of the temperature profiles throughout the reaction zones within the reactor tube, e.g. as depicted in FIG. 3 of the aforementioned U.S. Pat. No. 4,008,049.

Although in normal operations the reaction conditions in each reaction zone can be controlled rather precisely, a fortuitous upset in the initiator/monomer ratio or failure of control instruments can cause the temperature to rise within a reaction zone to levels where degradation of the product occurs and sometimes the degradation is so severe that the polyethylene product completely decomposes into carbon and hydrogen. The decomposition causes a dangerous and rapid increase in pressure to levels where the reactor tube might burst. It was generally believed that polyethylene decomposition occurred in the form of an explosion of considerable force involving pressure increases of up to about 500,000 psi per second. In order to minimize fire and explosion hazards to prevent serious damage to the equipment in case of a decomposition, as the pressure front proceeds within the reactor tube it has been the usual practice to install a multitude of rupture discs at regular intervals along the total length of the reactor tube. It was considered essential that the rupture discs were located immediately before the bends of the reactor tube to allow the pressure front to proceed in a straight line and be released through the rupturing disc without a change in direction. For this purpose the rupture discs were installed within connection blocks of a modified Y shape in a position perpendicular to the flow direction. Such blocks are shown in FIG. 1 of the aforementioned U.S. Pat. No. 4,008,049, e.g. by numerals 40 and 50, and the rupture discs were installed within the unconnected horizontal extension or arm of the Y block.

Although the aforementioned rupture discs function well in case of decomposition, the experience has been that in many instances a disc would rupture without any apparent reason for the failure, i.e. there were no indications of reactor condition upsets or degradation of the polymer product at the time of the rupture. In view of the considerable capital cost for each rupture disc installation and associated equipment, such as stacks and the production losses occurring during "down times" of a reactor it is therefore desirable to minimize both the number of rupture disc installations as well as the number of failures of the discs for causes other than polymer decomposition.

It is therefore an object of the present invention to provide a tubular high pressure polymerization reactor having a minimum of rupture discs without sacrificing safety. Another object of the invention is to provide a tubular high pressure reactor having rupture discs positioned in specific locations to minimize or obviate failures due to causes other than decomposition of polymer.

A further object of the invention is to provide a novel rupture disc-connection block assembly.

THE INVENTION

In accordance with the present invention there is provided a high pressure tubular polymerization reactor having at least two reaction zones, comprising a plurality of tubular sections, connection devices between adjacent tubular sections, means for introducing monomer feed to the inlet of each of said reaction zones; separate means for introducing polymerization initiator to the inlet of each of said reaction zones, and associated with each reaction zone a singular rupture disc disposed within a connection device positioned downstream of said inlet at a maximum distance of about 40 feet therefrom.

Figure 3:
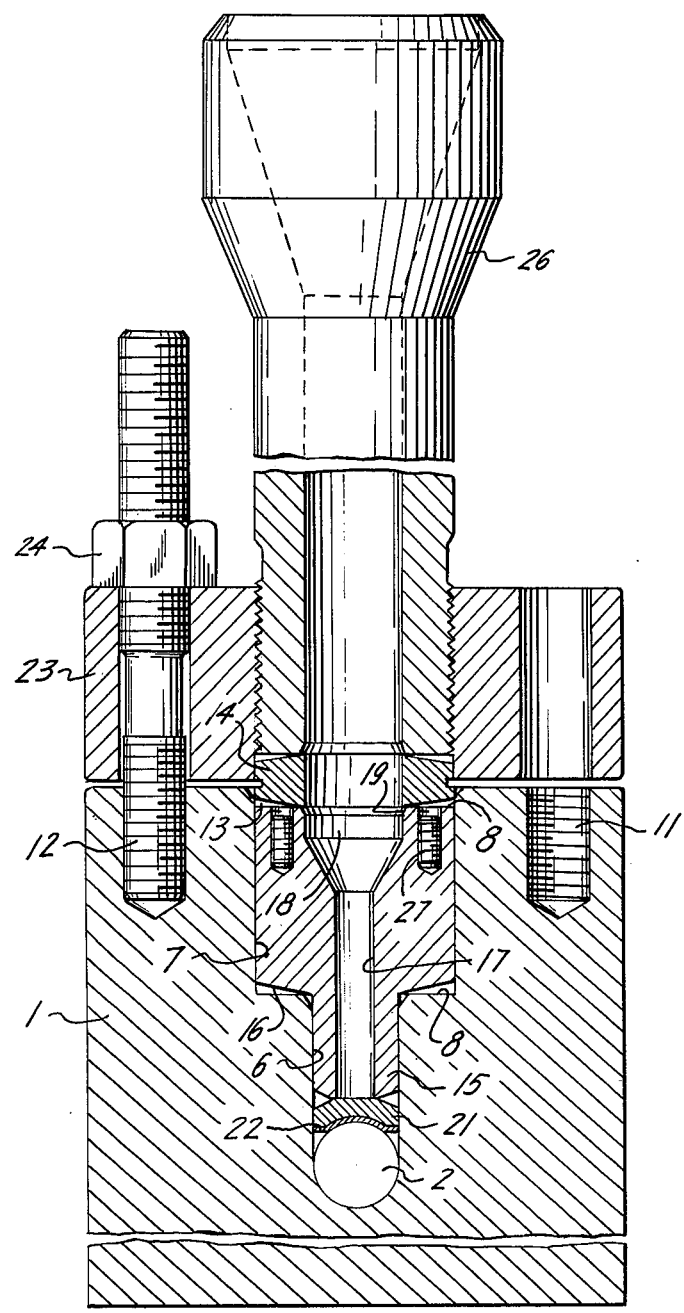
FIG. 3 is a sectional view of the connection block taken on line B—B, also showing a complete rupture disc assembly.

Contrary to the previous theory discussed before, it has now been found that when decomposition of polyethylene occurs in a reaction zone, it is in the form of deflagration which appears to be focused around the point of initiator introduction or in the vicinity thereof. A flame front travels from this point in both directions at a relatively slow speed, i.e. about the speed of sound. It has also been found that failures of the rupture discs for causes other than decomposition are to a great extent caused by excessive cyclic temperature and pressure stresses imposed on said rupture discs, i.e. the disc failures are due to fatigue rather than over pressure. It is therefore important that the rupture discs be located where the combination of cyclic pressure and temperature stresses are minimized. These cyclic pressure and temperature stresses mainly include those caused by the bump cycles referred to hereinabove, i.e. the deliberate periodic reduction of reactor pressure which causes a shift in the temperature profile as depicted in FIG. 3 of U.S. Pat. No. 4,008,049 (from profile 110 to profile 112 in zone number 1). Minimum cyclical stresses occur in the reaction zone where the fluctuation in temperature is at a minimum.

Since the pressure fluctuations are deliberate, it follows that the minimum cyclical stress conditions are prevailing at a location where the temperature fluctuations are at a minimum. The rupture disc device should therefore be positioned as close to the initiator introduction point as possible.

However, these high pressure reactors are manufactured from interconnecting thick-walled, flanged tubular segments, which are bolted together by means of massive connection blocks or other fatigue resistant fittings. Each of these blocks or fittings usually also serves as an access port to the reactor, e.g. as instrumentation ports, or introduction points for initiator streams, monomer side streams, modifiers, etc. Each segment of the reactor tube is surrounded by a separate cooling jacket provided with jacket water bypass conduits around the connection devices to provide flow of coolant serially through adjacent jackets. Although it would be desirable to position the rupture disc in the same connection device used for initiator introduction or in an adjacent connection device, it is not a feasible solution considering the additional stress concentration effects imposed by such arrangements.

In view of the above-mentioned considerations which must be given to the design of a high pressure tubular reactor for the polymerization of ethylene, the rupture disc is suitably positioned a short distance downstream from the initiator inlet, i.e. in the subsequent connection device used in joining the first section of the reaction zone with the next section. This distance should not exceed about 40 feet and preferably is from about 24 to about 40 feet, most preferably from about 28 to about 33 feet.

The disc or diaphragm is positioned within said connection device in a lateral bore which is perpendicular to the longitudinal passage or bore providing flow of reactants between two adjacent tubular reactor segments. For the purpose of this application, the usual definition of reaction zone is intended, i.e. a reaction zone begins at the point where contact of monomer and fresh initiator occurs and ends where the maximum temperature peak is measured during a bump cycle.

In accordance with this invention the number of rupture discs installed throughout the total length of the reactor tube is exactly the same as the number of reaction zones established within the tubes by the separate introduction of initiator.

Rupture discs are commercially available for any desired service and therefore the choice of material of construction, signing, etc. need not be discussed for the understanding of the invention.

The connection device should be fabricated from high strength metal such as high grade alloy steels and the like.

Figure 1:
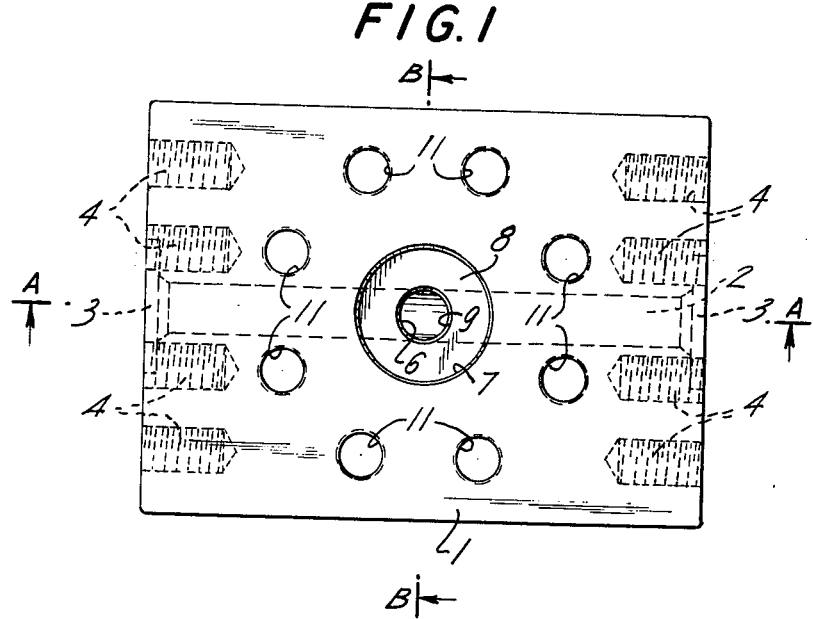
FIG. 1 shows a plan view of a connection block adapted for a rupture disc installation.
Figure 2:
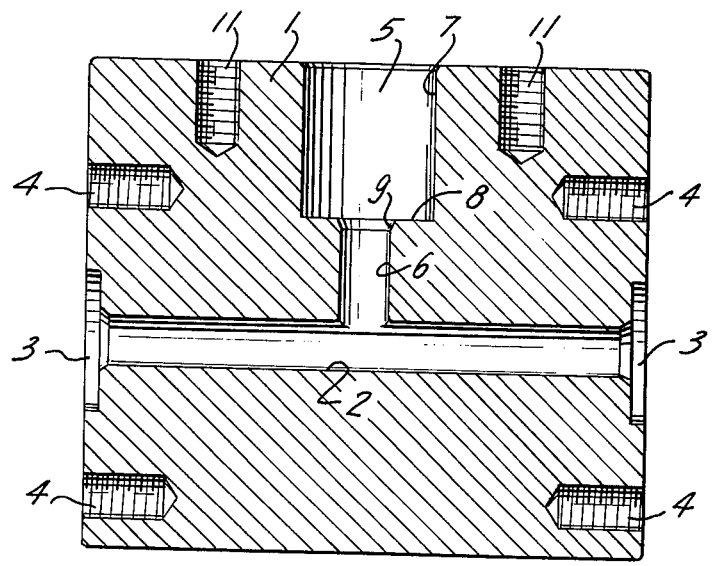
FIG. 2 is a sectional view of the connection block taken on line A—A.

The rupture disc can be positioned and installed in the block in any known fashion, however, a particularly advantageous rupture disc-connection block assembly is shown in FIGS. 1-3. In such an asembly there is a minimum of volume in which during down-times and purging of the reactor some impurities such as small traces of air, could be entrapped, which impurities could affect the product quality or even promote complete decomposition of the reaction mixture during subsequent operations.

Referring to the drawings in FIG. 1, 2 and 3 there is shown a rectangular block 1 provided with longitudinal bore 2, recesses 3 adapted to receive a sealing cone ring at each end (not shown) and recesses 4 adapted to receive threaded stud bolts (not shown). On each side and aligned with the longitudinal bore there is a flanged section of a tubular reactor attached in sealing contact by means of the stud bolts, sealing ring and nuts (not shown). Perpendicular to the longitudinal bore there is a lateral bore 5, which at its lower portion 6 has a diameter substantially equal to that of the longitudinal bore, and at its upper portion 7 has a diameter substantially larger than the longitudinal bore. A ring shaped seat 8 is thereby provided, which, if desired, is beveled at its inner edge 9 as shown in FIG. 2 for better sealing contact with the inserted rupture disc holder. Recesses 11 located in the upper portion of the block are adapted to receive threaded stud bolts 12 shown in FIG. 3.

Supported by seat 8 and in sealing contact at least at the inner edge of the seat there is a close fitting rupture disc holder 15, which is removably positioned within the lateral bore. The upper portion of the holder extends upwards from the seat to near the upper surface of the block thereby forming a recess 13 adapted to receive sealing cone ring 14, while the lower portion of the holder extends downwardly into the lower portion 6 of the lateral bore. To achieve better sealing contact between the holder and the seat 8 the necked-in area 16 of the holder is slightly angled. Throughout the holder there is located a central lateral bore 17, the diameter of which is gradually widened into an inverted frustoconical space 18 and preferably widened at the uppermost portion 19 to provide improved sealing contact with seal ring 14 when fully assembled. A support ring 21 is affixed, such as by welding, to the bottom portion of the holder and finally a rupture disc (diaphragm) 22 which is fixedly attached to the support ring, is positioned at the junction of the lateral bore and the uppermost portion of the longitudinal bore.

Sealing contact is achieved by means of flange 23, sealing ring 14, stud bolts 12 and nuts 24. Within the flange 23 there is a threaded adapter 26, which serves to conduct escaping material from the reactor in case of failure through subsequent piping (not shown) to a stack for ultimate release to the atmosphere.

In case of failure causing the diaphragm to rupture, the flange and seal ring are removed, a removal tool is screwed into threaded holes 27, the holder is removed from the block, the support ring-rupture disc assembly is cut off and a new such assembly welded on to the bottom of the holder before reassembly of the components.

Figure 4:
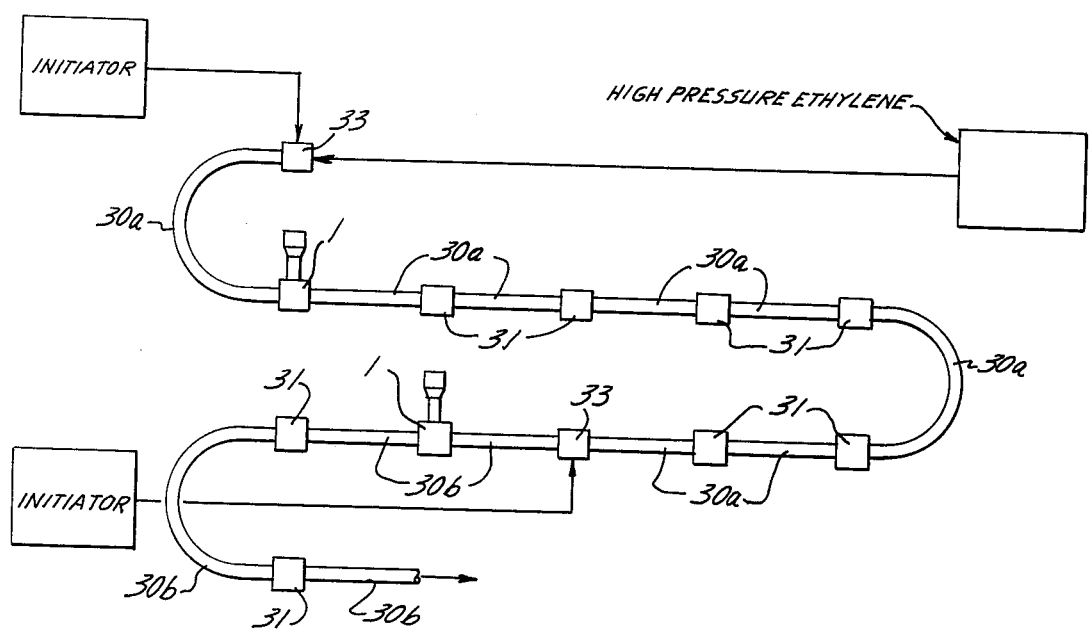
FIG. 4 diagramatically illustrates a portion of a polyethylene reactor including the improvements of this invention.

Referring now to FIG. 4, which is related to FIG. 1 of U.S. Pat. No. 4,008,049, there is shown a portion of an ethylene polymerization reactor, specifically a first reaction zone and part of the reaction zone adjacent to the first one. The first and second reaction zones are made up from tubular sections 30a and 30b respectively and joined by means of connection devices 31, 1 and 33. Connection devices 33 (2 shown), through which polymerization initiator is introduced into the inlet of each reaction zone, join adjacent reaction zones to each other. Rupture discs are disposed within the connection devices 1, which are immediately subsequent to connection devices 33.

The present invention is not limited to any particular tubular design, operating conditins, reactants or initiators. Generally, however, the inner diameters of the tubular segments in the reactor range between about 0.5 to about 3 inches and the reactor length between about 800 and about 3,000 feet or more. The reactor can be operated at pressures from about 15,000 to about 100,000 psi, preferably between about 30,000 and about 50,000 psi. The reaction temperatures generally range from about 250° F. to about 650° F. or higher.

The initiator for the polymerization reaction includes oxygen and the peroxides such as hydrogen peroxide, 2,4-dichlorobenzoyl peroxide, caproyl peroxide, lauroyl peroxide, t-butyl peroxyisobutyrate, benzoyl peroxide, p-chlorobenzoyl peroxide, diisopropyl peroxydicarbonate, acetyl peroxide, decanoyl peroxide, t-butyl peroxypivalate, t-butyl peroxyacetate, t-butyl peroxybenzoate, cumyl peroxide, diethyl dioxide, t-butyl hydroperoxide, methyl ethyl ketone peroxide, di-t-butyl diperoxyphthalate, hydroxyheptyl peroxide, cyclohexanone peroxide, p-menthane hydroperoxide, pinane hydroperoxide, cumene hydroperoxide, t-butyl peroxide, 2,5-dimethyl hexane-2,5 dihydroperoxide, t-butyl peroctoate, t-butyl peracetate, 1,1,3,3-tetramethyl butyl hydroperoxide, or mixtures thereof.

In addition to the ethylene feed, a comonomer in amounts ranging from 0.1 to 20 mole percent of the ethylene feed may be employed. Illustrative examples of such comonomers include alpha-olefins such as propylene, butenes and pentenes, and other comonomers such as vinyl acetate and the like. A chain transfer agent can also be introduced into the polymerization system with the feed in amounts ranging from 0.01 to 5 mole percent of the ethylene feed. The chain transfer agent includes, for example, hexane or butane or a comonomer such as propylene which also functions as a chain transfer agent. The addition of a comonomer and/or a chain transfer agent permits one to vary the physical properties of the polyethylene products as is well-known in the art.

What is claimed is:

1. A high pressure tubular polymerization reactor containing a plurality of bends and having a least two reaction zones, comprising:
   a plurality of tubular sections each having an inside diameter in the range of from about 0.5 to about 3 inches; connection block devices between adjacent tubular sections; means for introducing monomer feed to the inlet of each of said reaction zones; separate means for introducing polymerization initiator to the inlet of each of said reaction zones, and associated with each reaction zone a singular rupture disc disposed within a connection block device positioned downstream of said inlet at a distance of from about 24 to about 40 feet therefrom, wherein the connection device containing the rupture disc comprises a rectangular block having an upper surface, a bottom surface and two pairs of opposing side surfaces, said block being provided with a longitudinal bore extending from one side surface to its opposing surface, and a centrally positioned lateral bore in relation to and extending from said longitudinal bore upwards through the upper surface of the block, the diameter of the lower portion of the lateral bore being about equal to that of the longitudinal bore and the diameter of the upper portion of the lateral bore being substantially larger than that of the longitudinal bore, thereby providing a seat having a ring shape cross sectional area within the block;
   supported by said seat and closely fitting within said lateral bore a removable necked rupture disc holder having a larger diameter upper portion and a smaller diameter lower portion, said upper portion of said holder extending upwards from said seat to near the upper surface of the block, thereby providing a recess in the upper surface of the block, said lower portion of the holder extending downwardly from said seat into the lower portion of the lateral bore of the block, said holder being provided with a lateral bore having a relatively small diameter in the lower portion of the holder and a relatively large diameter in the topmost portion of the holder;
   a support ring affixed to the lower portion of the holder and having about the same cross sectional dimensions as those of said lower portion of the holder;
   a rutpure disc affixed at its periphery to the support ring and positioned at the junction of the lateral bore of the block and the uppermost portion of the longitudinal bore;
   means for providing sealing contact between the rupture disc holder and the seat within the block.

2. The reactor of claim 1 wherein said distance is from about 28 to about 33 feet.

3. The reactor of claim 1, wherein the seat within the block is beveled at its inner edge.

4. The reactor of claim 1, wherein the neck of said holder is slightly angled.

5. The reactor of claim 1, wherein the upper portion of the lateral bore of the holder has an inverted frustoconical shape.

6. The reactor of claim 1, wherein the inside edge of the holder at its uppermost portion is beveled.

7. The reactor of claim 1, wherein the means for providing sealing contact between the rupture disc holder and the seat within the block comprises a flange having a recess within its lower central portion, a seal ring seated in the recesses of the flange and the upper surface of the block, said flange being removable attached to said block.

8. The reactor of claim 7, wherein hollow adapter means is provided within the flange for conducting material escaping from the reactor through a ruptured disc to a stack.

* * * * *